A. A. HEATH.
Harvester.

No. 47,639. Patented May 9, 1865.

Witnesses:

Inventor:

UNITED STATES PATENT OFFICE.

A. A. HEATH, OF WEST GREENVILLE, PENNSYLVANIA.

IMPROVEMENT IN HARVESTERS.

Specification forming part of Letters Patent No. 47,639, dated May 9, 1865.

*To all whom it may concern:*

Be it known that I, A. A. HEATH, of West Greenville, in the county of Mercer and State of Pennsylvania, have invented certain new and useful Improvements in Grain and Grass Harvesters; and I do hereby declare that the following is a full, clear, and exact description thereof, which will enable others skilled in the art to make and use the same, reference being had to the accompanying drawings, in which—

Figure 1:
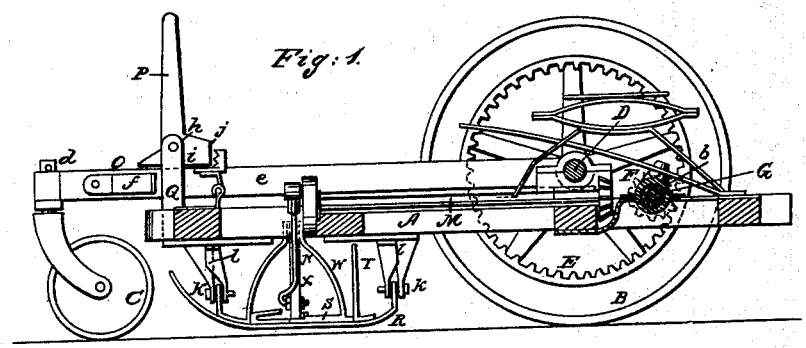
Figure 3:
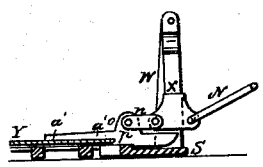
Figure 4:
Figure 2:
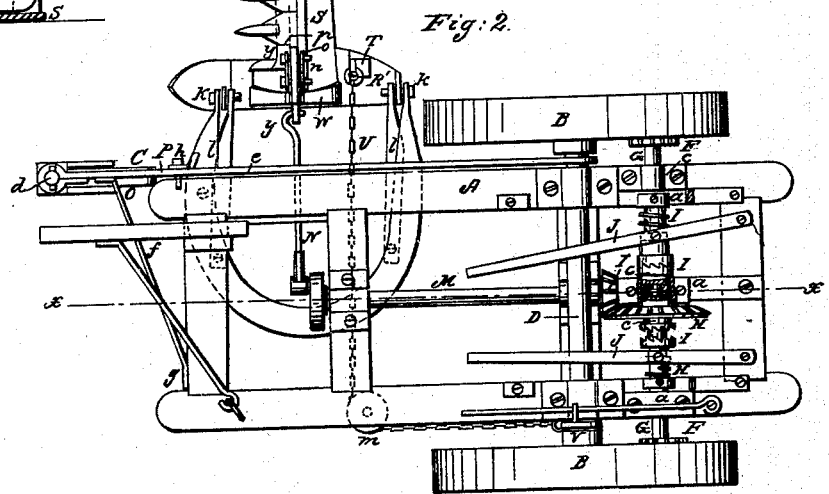

Figure 1 is a side view of my invention; Fig. 2, a plan or top view of the same; Fig. 3, a section of a portion of the same taken in the line $x\ x$, Fig. 2; Fig. 4, a section of a portion of the same taken in the line $y\ y$, Fig. 2.

Similar letters of reference indicate like parts.

This invention relates to an improvement in the sickle-driving mechanism whereby the machine is rendered capable of being readily turned and backed and the parts rendered durable and not liable to catch the cut grass or grain as the machine is drawn along in order to perform its work.

The invention also relates to an improved means of applying the pitman to the sickle-bar, the advantages of which will be hereinafter set forth.

A represents the frame of the machine, of rectangular form, supported at its rear part by two wheels, B B, and at its front end by a caster-wheel, C. The wheels B B are fitted loosely on their axle D, and each of said wheels has a toothed rim, E, attached to or cast concentrically on it. These rims E have pinions F gearing into them, which are on separate or independent shafts G G, fitted into suitable bearings, $a$, on the frame A, the inner ends of said shafts being in the same bearing and inclosed by a collar, $b$, which forms the hub of a bevel-wheel, H, the collar $b$ being allowed to turn freely on the shafts G G. (See Fig. 2.) On each end of the collar $b$ there is a ratchet, $c$, which forms one part of a clutch, I, the other parts, $c'$, being precisely similar to $c$, and fitted by feathers and grooves on the shaft G, one on each. These parts $c'$ of the clutches I have each a lever, J, connected to them, and a spring, K, bears against the outer side of each part $c'$, said springs having a tendency to keep the parts $c'$ in gear with the parts $c$, so as to connect the bevel-wheel H with the shafts G G and cause its rotation when the machine is backed. The parts $c'$, however, owing to the formation of their teeth, will slip over the teeth of the parts $c$, and the bevel-wheel H will not be turned. The bevel-wheel H gears into a bevel-pinion, L, which is on a crank-shaft, M, from which the sickle is driven by a pitman, N, the shaft M occupying a longitudinal and central position on the frame A.

By this arrangement it will be seen that the sickle is rendered inoperative when the machine is backed, and in turning the machine, by disconnecting one of the shafts G from the wheel H, much draft and friction are avoided. The wheel H, in consequence of being on the collar $b$, which is inclosed by the central bearing, $a$, is firmly retained in position, being prevented from twisting under lateral concussion, and hence it will always work truly; and as all the parts above specified are within the frame A, and considerably elevated, they are beyond the reach of cut grass or grain.

The caster-wheel C has its standard $d$ fitted in a bearing at the front end of a frame, O, composed of a straight bar, $e$, and an oblique bar, $f$, the former extending along at one side of the machine and fitted at its rear end loosely on the axle D, and the latter secured by a pivot-bolt, $g$, to the front cross-bar of the frame A.

P is a lever which has its fulcrum-pin $h$ in a stirrup or link, Q, attached at its lower end to the frame A, the bar $e$ of the frame O passing through said stirrup or link. The lower part of the lever P is quite broad, so as to form two bearing-surfaces, $i\ j$, at right angles with each other, the lever being in an upright position when the surface $i$ rests or bears upon the bar $e$ of the frame O, and in a horizontal position when the surface $j$ bears upon it, and the latter surface is considerably farther from the fulcrum-pin $h$ of the lever than the surface $i$, and hence when the lever P is turned down to a horizontal position the frame A will be raised, and also the inner ends of the finger-bar and sickle which are attached to it.

R is a shoe, which is connected by joints $k$ $k$ to bars $l\ l$, which project obliquely downward from the right side of the frame A. To this shoe R the finger-bar S is secured. To the shoe R there is attached a standard, T, to the upper end of which a chain, U, is secured, said chain passing around a pulley, $m$, at the under left-hand side of the frame A, and extending back to the lower part of a lever, V, where it is attached, said lever being fitted loosely on the axle D.

It will be seen from the above description that when the frame A is raised by driving back the lever P to a horizontal position the inner ends of the finger-bar and sickle will only be raised as the shoe R is connected to the inclined bars $l\, l$ by joints $k\, k$, and therefore to elevate the outer ends of the finger-bar and sickle the arrangement of the lever V, chain U, and standard T is necessary. Either end of the finger-bar and sickle may be raised separately, or one without the other, or both ends raised, so that they may be above the surface of the ground when the machine is being drawn from place to place. By this arrangement the sickle may be made to pass over obstructions which may lie in its path, or the sickle entirely raised when not designed for operation.

To the shoe R there is attached an upright bail-shaped frame, W, in which a bar, X, is suspended and allowed to swing freely. (See Fig. 1). To the lower end of this swinging or pendulum bar the pitman N is attached, and said bar is also connected at its lower end to the inner end of the sickle Y by means of a link, $n$, as shown clearly in Fig. 3. The link $n$ is connected to an eye, $o$, formed in a bar, $p$, which is attached to the sickle, and this bar $p$ extends back underneath the swinging or pendulum bar X, as shown clearly in Fig. 3. By this means the sickle Y is prevented from rising at its inner end, and much friction and consequent wear and tear avoided in the driving of the sickle. The pitman also can be more elevated and out of the way of cut grass or grain.

The sickle-bar, just back of its teeth $a'$, is rabbeted at its under side longitudinally, as shown at $b'$, to run or work against the front edge of the finger-bar S, (see Fig. 4,) and this rabbet forms a shoulder, $c'$, on the top of the sickle-bar for the back ends of the teeth $a'$ to abut against. (See Fig. 1.) By this mode of construction the sickle-bar may be tapered from its inner to its outer end, and consequently made stronger at the inner end, where the greatest strength is required.

The bar $p$, in which the eye $o$ is made and to which the pitman N is connected, is attached to the finger-bar S by rivets directly over the teeth $a'$ at the inner end of the finger-bar.

Having thus described my invention, I claim as new and desire to secure by Letters Patent—

1. The combination of the collar $b$ of the bevel-wheel H, pinion-shafts G G, and clutches I I, arranged substantially as and for the purpose herein set forth.

2. The caster-wheel C, attached to the frame O, applied to the main frame A of the machine, substantially as shown, in combination with the lever P applied to the machine, substantially as shown, to operate in the manner as and for the purpose specified.

3. The combination of the pitman N, pendulous bar X, standard W, link $n$, and sickle $y$, arranged and operated as and for the purpose described.

A. A. HEATH.

Witnesses:
 WM. BUCK,
 I. K. HAMBLIN.